(12) United States Patent
Thumati (10) Patent No.: US 11,586,182 B2
(45) Date of Patent: Feb. 21, 2023

(54) SYSTEM AND DEVICE TO AUTOMATICALLY IDENTIFY DATA TAGS WITHIN A DATA STREAM

(71) Applicant: The Boeing Company, Chicago, IL (US)

(72) Inventor: Balaje T. Thumati, Wildwood, IL (US)

(73) Assignee: The Boeing Company, Chicago, IL (US)

( * ) Notice: Subject to any disclaimer, the term of this patent is extended or adjusted under 35 U.S.C. 154(b) by 35 days.

(21) Appl. No.: 17/463,147

(22) Filed: Aug. 31, 2021

(65) Prior Publication Data

US 2022/0137602 A1 May 5, 2022

Related U.S. Application Data

(60) Provisional application No. 63/109,724, filed on Nov. 4, 2020.

(51) Int. Cl.
| | | |
|---|---|---|
| *G05B 19/418* | (2006.01) | |
| *H04L 69/22* | (2022.01) | |
| *H04L 67/561* | (2022.01) | |
| *H04L 67/12* | (2022.01) | |

(52) U.S. Cl.
CPC ........ *G05B 19/4185* (2013.01); *H04L 67/561* (2022.05); *H04L 69/22* (2013.01); *G05B 2219/31346* (2013.01); *G05B 2219/33034* (2013.01); *H04L 67/12* (2013.01)

(58) Field of Classification Search
CPC ...... G05B 19/4185; G05B 2219/31346; G05B 2219/33034; H04L 76/561; H04L 69/22; H04L 67/12
See application file for complete search history.

(56) References Cited

U.S. PATENT DOCUMENTS

| | | | |
|---|---|---|---|
| 2019/0324439 A1* | 10/2019 | Celia | G06N 7/005 |
| 2019/0339688 A1* | 11/2019 | Celia | G05B 23/0229 |
| 2019/0349426 A1* | 11/2019 | Smith | H04L 9/0825 |
| 2021/0194894 A1* | 6/2021 | Anderson | H04L 63/1408 |

* cited by examiner

*Primary Examiner* — Normin Abedin
(74) *Attorney, Agent, or Firm* — Ferguson Braswell Fraser Kubasta PC (57) ABSTRACT

A method including receiving a data packet over a network, the data packet having a size. The method also includes parsing the data packet into a header and a body. The method also includes identifying a protocol type from the header and the size. The method also includes identifying a signal characteristic of signal data in the body. The method also includes identifying a classification of a source sensor which generated the data packet based on the protocol type and the signal characteristic. The method also includes generating a metadata file based on the source sensor. The method also includes labeling the data packet with the metadata file to form a labeled data packet.

20 Claims, 7 Drawing Sheets

SYSTEM AND DEVICE TO AUTOMATICALLY IDENTIFY DATA TAGS WITHIN A DATA STREAM

CROSS-REFERENCE TO RELATED APPLICATIONS

This application claims priority under 35 U.S.C. § 119(e) to U.S. Provisional Patent Application No. 63/109,724, which filed on Nov. 4, 2020. U.S. Provisional Patent Application No. 63/109,724 is hereby incorporated by reference in its entirety.

BACKGROUND

Sensors can be useful tools for gathering data about one or more objects. Often, the sensor data is fed to a computer system for processing. However, in some instances, the raw sensor data may be inadequate for certain data processing projects. In these instances, the raw data is labeled with metadata in order to provide additional information for a particular processing project.

When data is labeled, a human uses a computer to review and label the data. Such a process can be laborious, or even impractical, such as when millions of different types of data points are to be labeled.

SUMMARY

One or more embodiments provide for a method. The method includes receiving a data packet over a network, the data packet having a size. The method also includes parsing the data packet into a header and a body. The method also includes identifying a protocol type from the header and the size. The method also includes identifying a signal characteristic of signal data in the body. The method also includes identifying a classification of a source sensor which generated the data packet based on the protocol type and the signal characteristic. The method also includes generating a metadata file based on the source sensor. The method also includes labeling the data packet with the metadata file to form a labeled data packet.

One or more embodiments provide for another method. The method includes operating a tool on a workpiece. The method also includes sensing, using a source sensor, a parameter of the workpiece while operating the tool on the workpiece. The method also includes transmitting, by the source sensor via a network, a data packet containing information regarding the parameter to a computer, the data packet having a size. The method also includes parsing, by the computer, the data packet into a header and a body. The method also includes identifying, by the computer, a protocol type from the header and the size. The method also includes identifying, by the computer, a signal characteristic of signal data in the body. The method also includes identifying, by the computer, a classification of the source sensor which generated the data packet based on the protocol type and the signal characteristic. The method also includes generating, by the computer, a metadata file based on the source sensor. The method also includes labeling, by the computer, the data packet with the metadata file to form a labeled data packet. The method also includes passing, by the computer, the labeled data packet to a tool control system. The method also includes modifying, using the tool control system, operation of the tool on the workpiece.

The one or more embodiments also provide for a system. The system includes a communication interface configured to receive a data packet over a network, the data packet having a size. The system also includes a data packet parser configured to parse the data packet into a header and a body. The system also includes a data repository storing a classification system. The system also includes a processor. The processor is programmed to identify a protocol type from the header and the size. The processor is also programmed to identify a signal characteristic of signal data in the body. The processor is also programmed to apply the classification system to identify a classification of a source sensor which generated the data packet based on a combination of the protocol type and the signal characteristic. The processor is also programmed to generate a metadata file based on the source sensor. The processor is also programmed to label the data packet with a metadata file to form a labeled data packet. The processor is also programmed to transmit the labeled data packet.

Other aspects of the one or more embodiments will be apparent from the following description and the appended claims.

DETAILED DESCRIPTION

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," or "substantial," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" or "substantially congruent" if the values of the two angles are within ten percent of each other. However, if an engineer determines that the engineering tolerance for a particular product should be tighter, then "about congruent" or "substantially congruent" could be two angles having values that are within one percent of each other. Likewise, engineering tolerances could be loosened in other embodiments, such that "about congruent" or "substantially congruent" angles have values within twenty percent of each other. In any case, the ordinary artisan is capable of assessing what is an acceptable engineering tolerance for a particular product, and thus is capable of assessing how to determine the variance of measurement contemplated by the terms "about" or "substantially."

As used herein, the term "connected to" contemplates at least two meanings. In a first meaning, unless otherwise stated, "connected to" means that component A was, at least at some point, separate from component B, but then was later joined to component B in either a fixed or removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, one or more embodiments relate to automatically labeling sensor data from sensors with appropriate metadata that is used during further processing of the sensor data. A laborious task when collecting data from sensors used with respect to production equipment is labeling. Simply stated, a technician has to manual label each and every data point originating from a sensor, or actuator, or an internet of things (IoT) device. Then, the technician creates metadata that could be used for writing the sensor data into a database, or use the sensor data for data analytics. This process is very time consuming when considering millions of data points, or more.

Properly labeling the sensor data involves knowing the source of the data, which may be a non-trivial task in a large enterprise environment. Currently, there are no devices/systems that can actively identify the source of data by looking at the incoming data packets.

Therefore, one or more embodiments provide for a hardware and software system that automatically identifies data tags within a data stream, and creates a metadata file that is used for labeling the sensor data and for further data processing. The one or more embodiments consumes various incoming industrial network traffic (BACnet, Modbus, LonWorks) and standard Ethernet transmission control protocol/Internet protocol (TCP/IP), which are triaged depending on their protocol and message structure. Thereafter, using built-in logic or machine learning, the data source (pressure sensor, temperature sensor, electrical actuator, etc.) of each data packet is identified. Subsequently, metadata is created that identifies the source of the sensor data.

The one or more embodiments have several benefits. In one example, one or more embodiments allow for simplified equipment commissioning and upgrades, and will save thousands of labor hours which otherwise would be needed for tagging data points and sources. Furthermore, the one or more embodiments may be used to improve feedback control systems of equipment. In addition, the one or more embodiments enables monitoring of an industrial network for intrusion or exploits. Thus, one or more embodiments also help in detecting network exploits or attacks when a malicious user tampers with the message structure. In the event of a so-called "man-in-the-middle" attack, any modifications to data packets can be detected by the techniques described herein, and then appropriate counter-measures taken. Therefore, the one or more embodiments not only improve operation of sensors, improve control of machinery, but also provide for early detection of network attacks, and thereby improve network security.

Figure 1:
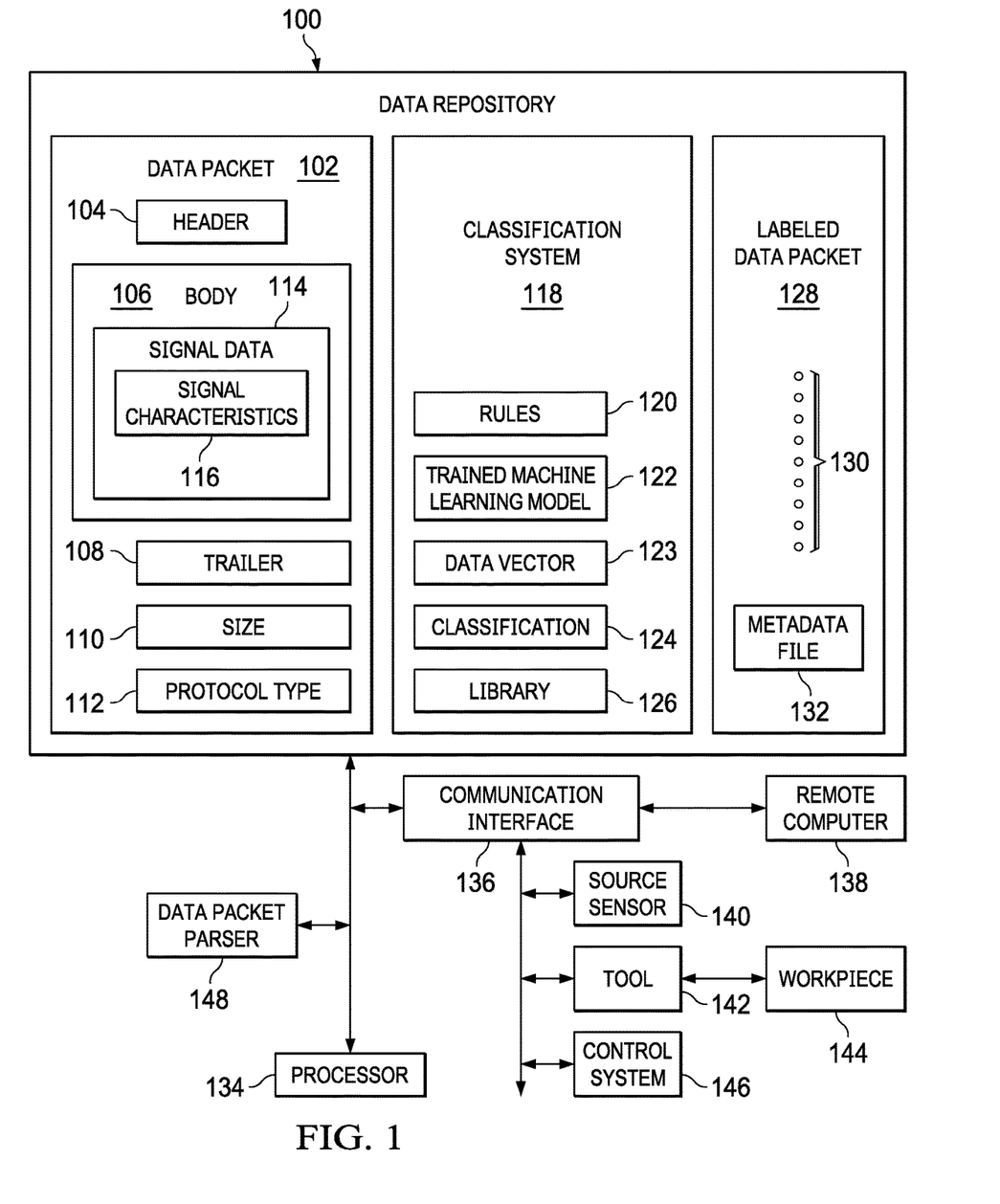
FIG. 1 shows a computing system, in accordance with one or more embodiments.

Attention is now turned to the figures. FIG. 1 shows a computing system, in accordance with one or more embodiments. The computing system includes a data repository (100). In one or more embodiments, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores a data packet (102). The data packet (102), broadly, can be described as having two parts: a header (104) and a body (106). Optionally, the packet may have a trailer (108). The header (104) is a portion of a data packet that precedes the body (106), and contains addressing and other data used to reach an intended destination of the data packet (102). The header (104), also known as the payload, contains the data of interest. The trailer (108), when present, may contain supplemental data (e.g. metadata) placed at the end of the header (104). The supplemental data may include information for handling the information in the header (104), may mark the end of the header (104), or may contain labeling information added by the one or more embodiments. Each of the header (104), the body (106), and the trailer (108) are delineated by a specification or format that allows for clear parsing of the different sections of the data packet (102).

The data packet (102) may also be described according to other properties. For example, the data packet (102) may be described has having a size (110). The size (110) is defined as the amount of memory used to store the data packet (102). Another property, for example, may be a protocol type (112) of the data packet (102).

Many different protocol types exist. Thus, the protocol type (112) may be a user datagram protocol (UDP), transmission control protocol (TCP), internet protocol (IP), the consultative committee for space data systems (CCSDS), custom protocol types, Modbus, Ethernet/IP, or many other different protocol types. Each different protocol type may affect definitions, structure, or limitations for the parts of the data packet (102) (e.g., the header (104), the body (106), the trailer (108), and the size (110)), and may specify additional fields in the data packet (102) not shown in FIG. 1. For example, the UDP protocol also defines the source port and destination port fields. Possibly many other information types exist, such as a sequence number field, acknowledgement number field, data offset, reserved field, flags field, window field, checksum field, urgent pointer field, options field, data field, version field, time-to-live field, and possibly many more.

Attention is now turned, in particular, to the body (106) of the data packet (102). The body (106), again, contains the data of interest. As used herein, the data of interest in the body (106) is referred-to as signal data (114). Stated differently, the signal data (114) is defined as data that describes, represents, or is the information sent by a source sensor, a tool, or some other machine. Thus, for example, if the data packet (102) was transmitted from a thermal sensor (i.e., a thermometer) monitoring the temperature of an autoclave, the signal data (114) could represent a temperature measurement.

The signal data (114) has different characteristics depending on the type of data represented by the signal data (114). Thus, the signal data (114) has at least one signal characteristic, such as signal characteristic (116). The signal characteristic (116) is a property of the signal data (114) that distinguishes the signal data (114) from other types of signal data (114). For example, referring to the temperature data example from above, temperature data may have a known range of memory sizes, may take a particular form, or may be identified from characteristics that indicate temperature units (e.g., a symbol that indicates Fahrenheit, Celsius, and Kelvin), or some other characteristic. In this manner, it is possible to identify from the signal characteristic (116) of the signal data (114), at least in part, a classification of the type of source sensor used to take the measurement.

The data packet (102) also stores a classification system (118). The classification system (118) is software that is programmed, when executed, to classify the source of incoming data packets based on information analyzed from the incoming data packets. Specifically, the classification system (118) takes the form of rules (120) or take the form of a trained machine learning model (122) trained to perform the classification. Details of the operation of the classification system (118), whether in the form of rules or of a machine learning model, are described with respect to FIG. 2A through FIG. 2E. However, briefly, the classification system (118) is configured to be applied to information contained in the data packet (102) in order to identify a classification of a source sensor which generated the data packet (102) based on a combination of the protocol type (112) and the signal characteristic (116).

The data repository (100) may also store a data vector (123). The data vector (123) is provided as input to the trained machine learning model (122). In one or more embodiments the data vector (123) is a data structure array including a one by many table, where each entry in the table represents a data point for a data entry. For example, the data vector (123) may include the signal data (114) and/or the signal characteristic (116) arranged in a one by many table data structure. Additional information may also be included in the data vector (123). For example, the additional information may include a timestamp of the data packet, a rate of data packet reception, a number of a plurality of data packets having a structure similar to the data packet, tool data describing possible tools for which source sensor data is taken, and workpiece data describing possible workpieces for which source sensor data is taken. The additional information may also include additional user-supplied data.

In any case, the data vector (123), as indicated above, is provided as input to the trained machine learning model (122). In turn, the trained machine learning model (122) outputs the classification (124) of the type of the source sensor.

As used herein, the rules (120) are policies or pre-programmed rules that take as input information (e.g., the signal characteristic (116) and the protocol type (112)) and output a deterministic result (i.e., a classification (124) of the data packet (102)). For example, a rule may define that if the signal data (114) contains a particular symbol and also that the protocol type (112) is the TCP/IP protocol, then the classification of the source sensor that sent the data packet (102) is a thermometer. With further data or rules, it may be possible to determine which thermometer, among may thermometers, sent the data packet (102).

The rules (120) may call on a library (126). As used herein, a library (126) is a collection of reference data useable for comparison purposes. For example, the library (126) may contain a table of symbols that are expected to be found in the signal data (114) of the body (106) of the data packet (102). The symbols, in turn, are associated with various different types of source sensors. In this manner, a particular signal characteristic (116) may be compared to the library (126) in order to determine, at least in part, the source sensor that sent the data packet (102) and/or the type of data contained in the body (106). Note that while only one library (126) is shown in FIG. 1, many different libraries may be present.

As indicated above, the rules (120) need not be the only tool of the classification system (118). Instead of the rules (120), or perhaps in addition to the rules (120), the classification system (118) may also use a trained machine learning model (122) for classification purposes. The trained machine learning model (122) is a program or algorithm which, when executed, finds possibly hidden relationships among data and outputs a prediction. The trained machine learning model (122) may be a supervised machine learning model, an unsupervised machine learning model, or some other type of machine learning model. The prediction may be, for example, a probability that the classification (124) is of a given source sensor that sent the data packet (102). The prediction may also predict other conclusions, such as a physical location of the source sensor, a type of tool or machine for which the source sensor is sensing parameters, and possibly other information.

Figure 2A:
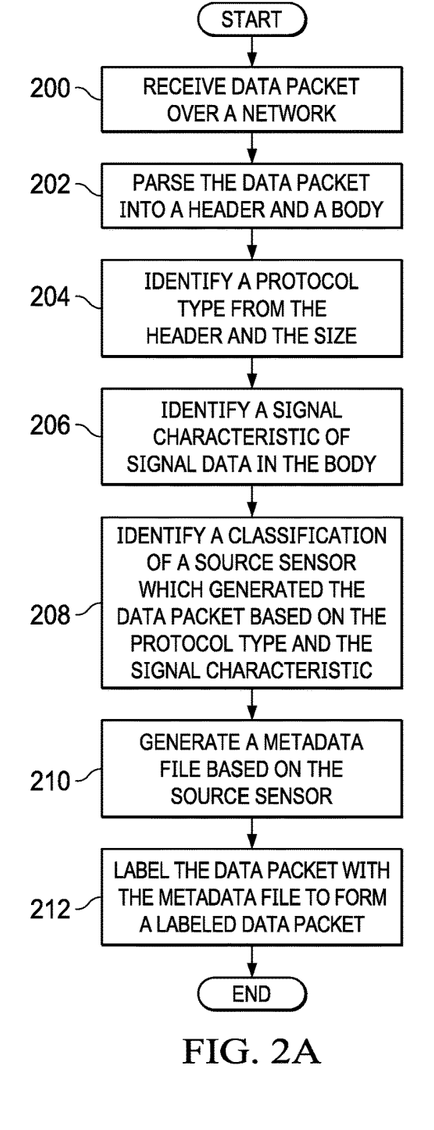
FIG. 2A, FIG. 2B, FIG. 2C, FIG. 2D, and FIG. 2E show methods of labelling data packets, in accordance with one or more embodiments.
Figure 2B:
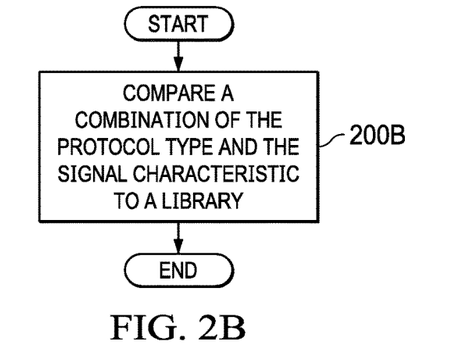
Figure 2C:
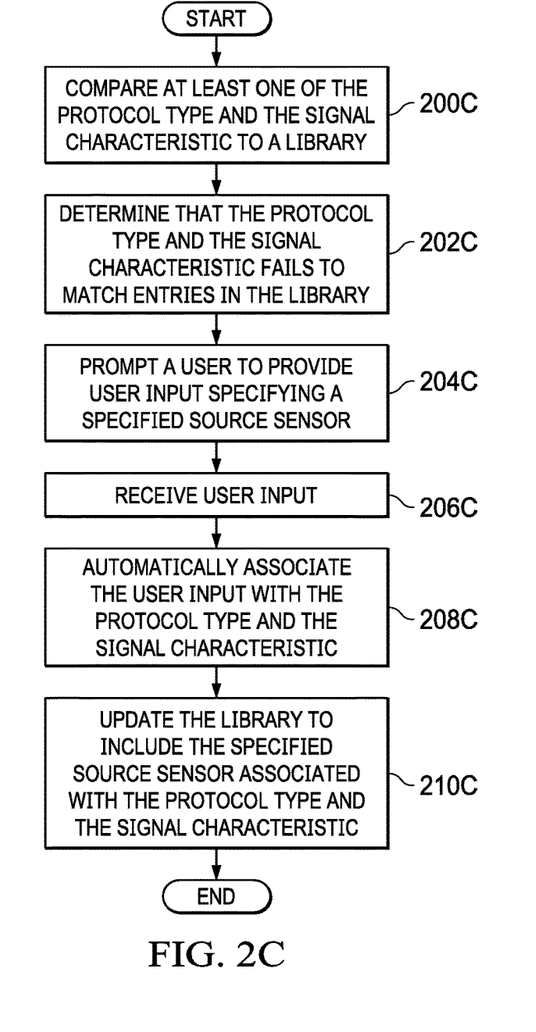
Figure 2D:
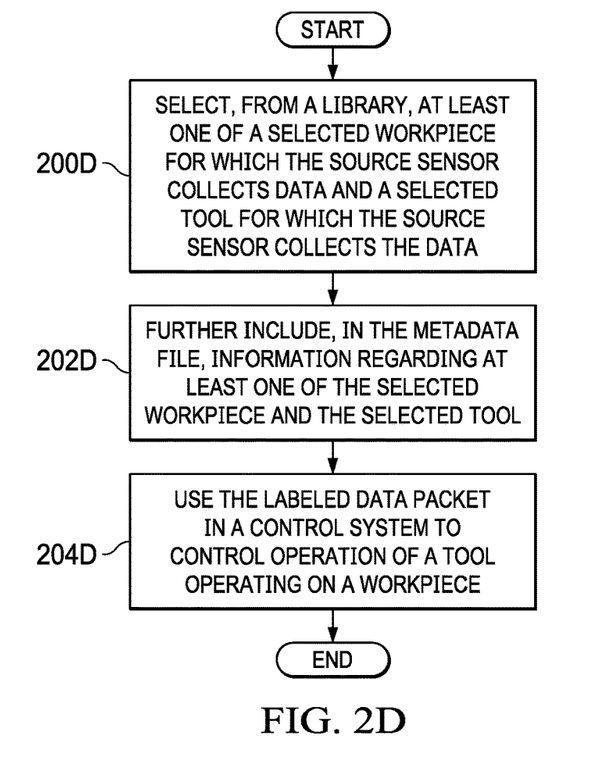
Figure 2E:
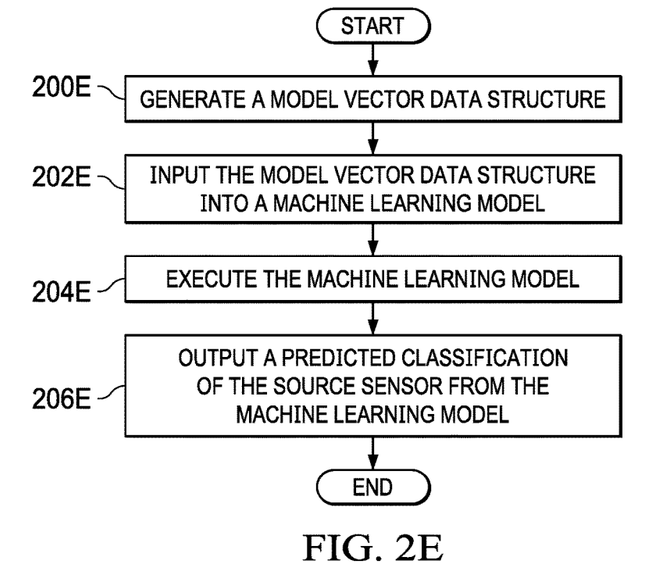

Operation of the trained machine learning model (122) is described in more detail with respect to FIG. 2E. Training of the trained machine learning model (122) is described in more detail with respect to FIG. 6.

The data repository (100) also stores a labeled data packet (128). The labeled data packet (128) is the data packet (102) after the classification (124) has been added to the data packet (102). The labeled data packet (128) thus may have the same or similar structure as the data packet (102), but the labeled data packet (128) will also include additional information containing the labeling. The additional information takes the form of a metadata file (132). Metadata, as used herein, is "data about data". In other words, the metadata file (132) contains additional data that describes other information in the data packet (102), primarily the signal data (114) in the body (106), but possibly also other information in the header (104) or the trailer (108), or other aspects of the data packet (102). The ellipsis (130) indicates such other information present in the labeled data packet (128).

The metadata file (132) contains the labels assigned to the signal data (114). In an embodiment, the metadata file (132) may be appended to other otherwise added or connected to the data packet (102) to form the labeled data packet (128). Generation of the metadata file (132) is described with respect to FIG. 2A.

The system shown in FIG. 1 contains other components. For example, the system shown in FIG. 1 also includes a processor (134). An example of the processor (134) is described with respect to FIG. 7A and FIG. 7B. The processor (134) is programmed to perform the functions described with respect to FIG. 2A through FIG. 2E, FIG. 3, or other functions described herein.

Figures 6, 7A, 7B:
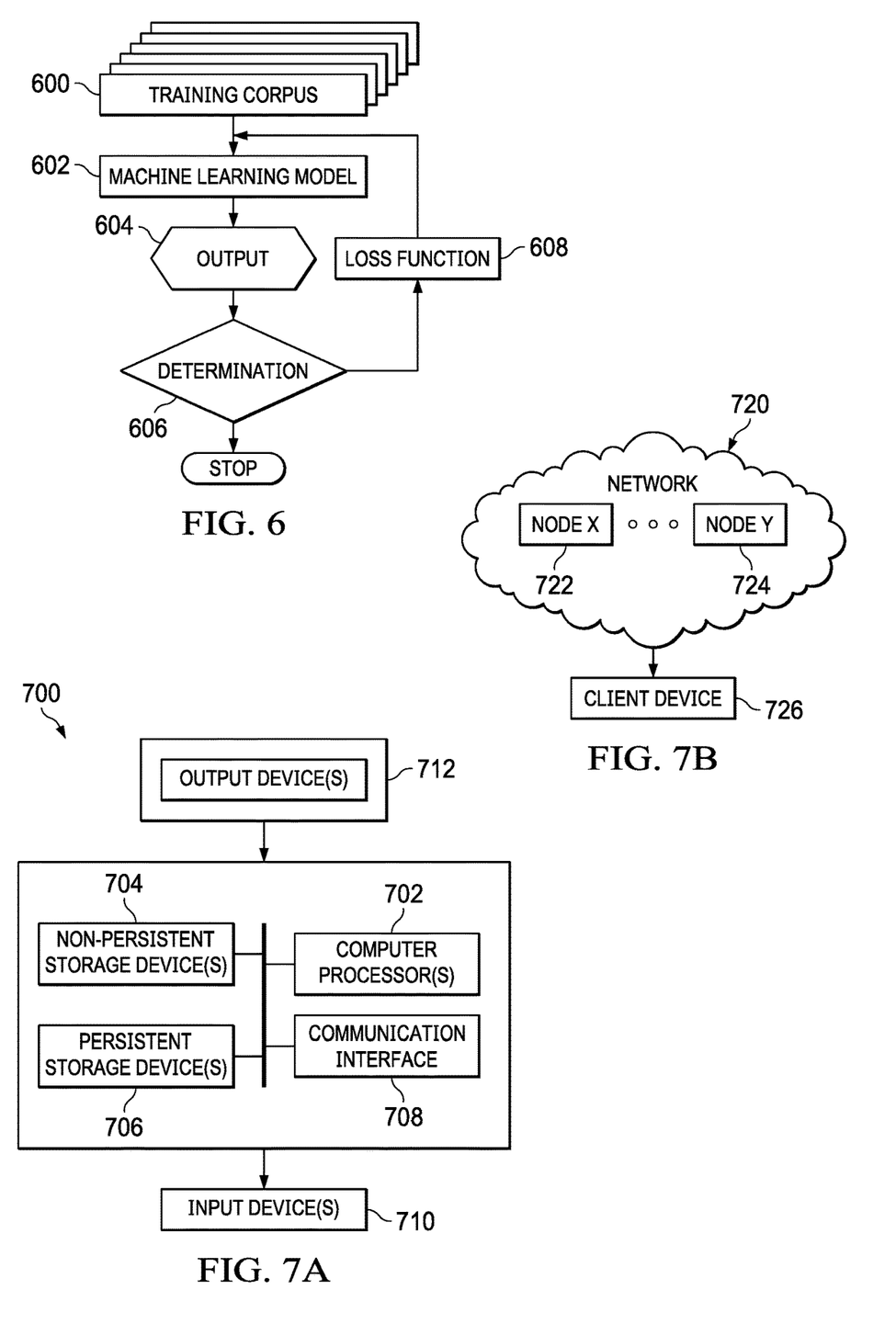
FIG. 6 shows a method for training a machine learning model, in accordance with one or more embodiments.
FIG. 7A and FIG. 7B show a computing system, in accordance with one or more embodiments.

The system shown in FIG. 1 may also include a communication interface (136). An example of the communication interface (136) is shown in FIG. 7A. The communication interface (136) may be used to communicate with other computers, such as remote computer (138). The remote computer (138) may be any computing device, such as a user computer that controls the system of FIG. 1. The remote computer (138) could also be a source sensor (140), tool (142), or machine described above. In any case, the remote computer (138) is configured to receive the data packet (102) over a network (such as network (720) in FIG. 7B). The remote computer (138) is also configured to transmit the labeled data packet (128). Transmission of data may be handled according to a convenient transmission protocol, as described above.

The source sensor (140) is a sensor that measures a physical parameter of the tool (142), a workpiece (144) on which the tool (142) operates, or of an environment in which the tool (142) or the workpiece (144) are placed. Examples of sensors include, but are not limited to, electrical sensors such as voltmeters, thermometers, accelerometers, magnetic sensors, angle sensors, pressure sensors, flow rate sensors, speed sensors, fuel gauges, etc.

The system shown in FIG. 1 may also include the workpiece (144). The workpiece (144) is an object upon which the tool (142) or other machine operates. In an example, if the tool (142) is a robotic assembly machine, then the workpiece (144) may be the object being assembled. In another example, if the tool (142) is a drill, the workpiece (144) may be a sheet of material into which a hole is to be drilled.

The system shown in FIG. 1 may also include a control system (146). The control system (146) is one or more mechanical or electrical devices, or both, that control the tool (142) or the workpiece (144). For example, the control system (146) could include a computer program or application specific integrated circuit (ASIC) that determines when to adjust the amount of heat being generated by an autoclave (i.e., the tool (142)) when heating a composite material (i.e., the workpiece (144)). In this case, the control system (146) includes an electrical circuit, controllable by the remote computer (138), to adjust the amount of heat being applied by the tool (142) to the workpiece (144). The heat is generated by a heater that is part of the autoclave.

In an embodiment, the labeled data packet (128) may be used as part of the control system (146). For example, the labeled data packet (128) may include data which may be used to determine when the workpiece (144) has been sufficiently cured by the tool (142). When the data in the labeled data packet (128) indicate that the workpiece (144) is overheating, the control system (146) may be used by the processor (134) to automatically command the tool (142) to reduce the amount of heating the tool (142) applies to the workpiece (144).

The system shown in FIG. 1 may also include a data packet parser (148). The data packet parser (148) is software and/or hardware that is configured to parse the data packet (102). In particular, the data packet parser (148) is configured to parse the data packet (102) at least into the header (104) and the body (106). Operation of the data packet parser (148) is further described with respect to FIG. 2A.

While FIG. 1 shows a configuration of components, other configurations may be used without departing from the scope of the one or more embodiments. For example, various components may be combined to create a single component. As another example, the functionality performed by a single component may be performed by two or more components.

Figure 3:
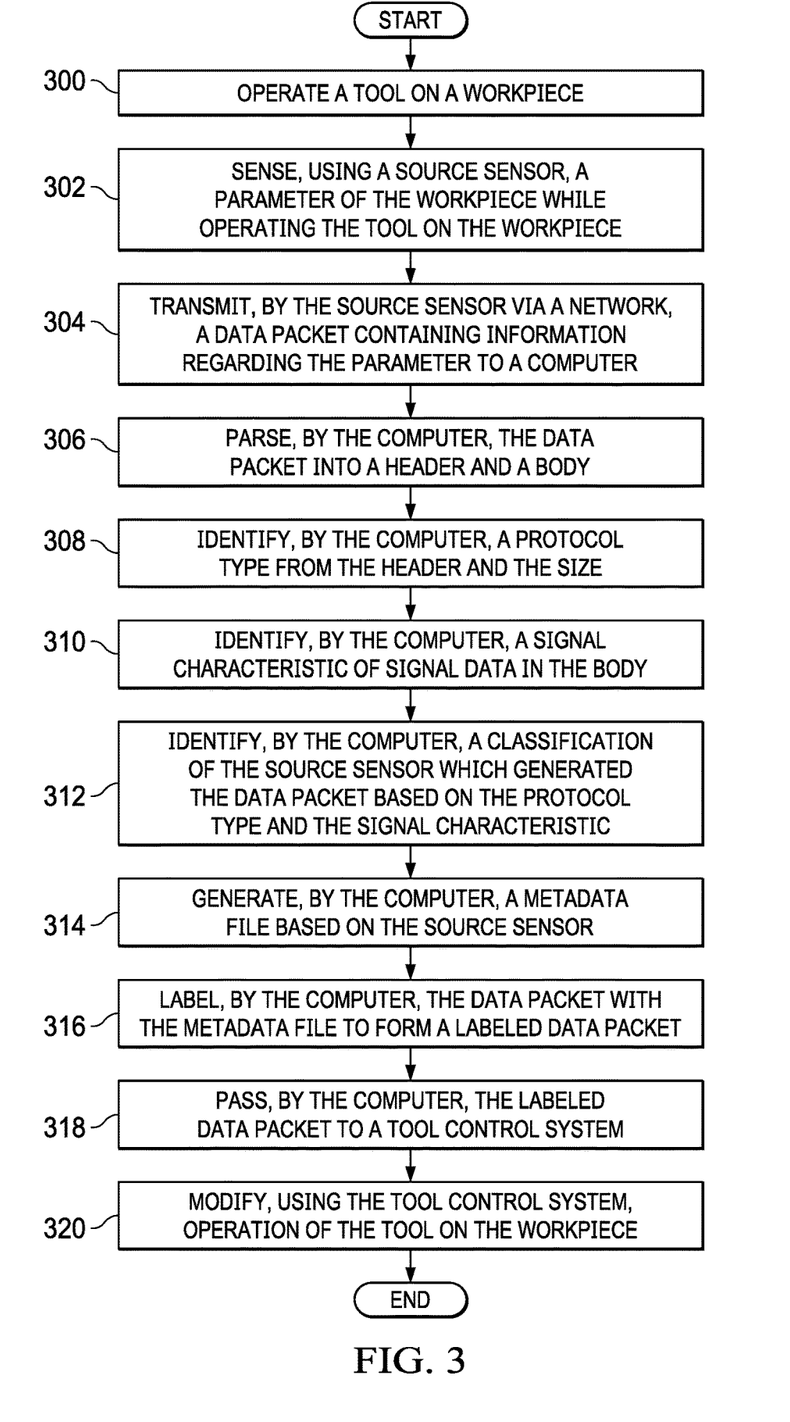
FIG. 3 shows a method modifying operation of a tool, in accordance with one or more embodiments.

FIG. 2A through FIG. 2E and FIG. 3 are flowcharts, in accordance with one or more embodiments. In particular, FIG. 2A through FIG. 2E show methods of labelling data packets, in accordance with one or more embodiments. In turn, FIG. 3 shows a method modifying operation of a tool, in accordance with one or more embodiments. The methods described with respect to FIG. 2A through FIG. 2E and FIG. 3 are examples of the system of FIG. 1 in use.

Attention is first turned to FIG. 2A. The method of FIG. 2A may be implemented using a computing system, such as the computing system shown in FIG. 7A and FIG. 7B. Thus, for example, the component executing the steps described below may be computer processor(s) (702) of FIG. 7A, or may be processor (134) of FIG. 1.

At step 200, a data packet is received over a network. The data packet has a size which, as described above, is an amount of memory used to store the data packet. The data packet may be received via a communication interface, such as communication interface (136) of FIG. 1, from a source sensor, such as source sensor (140) of FIG. 1.

At step 202, the data packet is parsed into a header and a body. The data packet may be parsed using a data packet parser, such as data packet parser (148) in FIG. 1. By parsing the data packet, the specific contents of the header and the body may be identified. The data packet parser may use header information or other portions of the data packet to identify which portions of the data packet constitute the header and the body.

At step 204, a protocol type is identified from the header and the size. Identification of the protocol type may be determined by comparing information in the header and the size to a library of known protocol types. For example, the header of a uniform datagram protocol (UDP) packet includes a source port, a destination port, a length, and a checksum. This information, as well as the overall size of the header can be used to determine that the data packet, in this particular example, is a UDP data packet.

Alternatively, a machine learning model may be used to identify the protocol type from the header information and the size of the packet. For example, the information in the header may be converted into a data structure known as a vector, and the vector input into a machine learning model such as a supervised or unsupervised machine learning model. When executed on the vector, the machine learning model correlates the data in the vector and outputs one or more predictions that the data packet is of several different packet types.

At step 206, a signal characteristic of signal data in the body is identified. In particular, the information in the body of the data packet is compared to a library. Signal characteristics in the body that match those in the library imply that the information in the body is associated with other facts stored in the library. Identification of the signal characteristic may also be performed using one or more machine learning models trained to identify one or more signal characteristics. The signal characteristics can then be compared to a library of signal characteristics to determine other information regarding the information in the body. For example, the body of a data packet contains the desired information which represents discrete quantized values of a sensor signal. By using the quantization and resolution information, the signal characteristics is determined. In a specific example, a 4-20 milliampere current signal and 0-10 voltage signal will have two different levels of discrete quantization and resolution. Therefore, by evaluating quantization levels and resolution within the body of a data packet, signal characteristics could be determined.

For example, at step 208, a source sensor which generated the data packet may be identified based on the protocol type and the signal characteristic. Again, the combination of the protocol type and signal characteristic may be compared to a library of source sensor classifications. When the combination of the protocol type and the signal characteristic matches an entry in the library, then it may be determined that the source sensor of the data packet is of a particular type. In some cases, the individual source sensor that generated the data packet may be identified in this manner.

Similarly, by converting the combination of the protocol type and the signal characteristic into a vector data structure, a machine learning model may be used to classify the data packet. Again, one or more machine learning models may be trained to predict a probability that a given combination of protocol type and signal characteristic corresponds to one or more source sensor types or individual source sensors. Training a machine learning model in this manner is described with respect to FIG. 6.

At step 210, a metadata file is generated based on the source sensor. The metadata file may be generated by comparing the classification of the source sensor to a library. For example, if the source sensor classification is "pressure sensor," then a pre-determined metadata file containing labeling information about pressure sensors may be generated. In this context, the term "generated" also includes retrieving, such as by retrieving the pre-determined metadata file from a data repository.

Alternatively, the metadata file may be built automatically. For example, if the source sensor classification is "accelerometer, type II," then the processor may individual retrieve entries from one or more libraries or data sources, and then collate the retrieved data into a new data structure (i.e., the metadata file).

At step 212, the data packet is labeled with the metadata file to form a labeled data packet. The data packet may be labeled with the metadata file by appending the metadata file to the data packet. For example, the metadata file may become a trailer attached to the data packet. Alternatively, the metadata file could be stored inside the body of the data packet, along with one or more characters or lines of code which can be used to retrieve the metadata from the body of the packet. Other techniques for labeling the data packet with the metadata file are available. In one embodiment, the method of FIG. 2A may terminate thereafter.

The method shown in FIG. 2A may be varied, as shown in FIG. 2B. For example, as described above, identifying the classification of the source sensor may include, as shown at Step 200B, comparing a combination of the protocol type and the signal characteristic to a library. The library includes pre-determined protocol types, pre-determined signal characteristics, and associated sensor types. The selected sensor type is selected form the library as a source sensor of the data packet.

In another example, as described above and as shown in FIG. 2C, at step 200C, the method includes identifying the classification of the source sensor may include comparing the protocol type and the signal characteristic to a library. In other words, rather than comparing the combination, one or both of the protocol type and the signal characteristic may be compared to the library separately such that at least one of the protocol type and the signal characteristic are compared to the library. Again, the library includes pre-determined protocol types, pre-determined signal characteristics, and associated sensor types.

However, the method of FIG. 2C includes other steps. For example, at step 202C, a determination is made that the protocol type and the signal characteristic fails to match entries in the library. In this case, at step 204C, a user is prompted to provide user input specifying a specified source sensor.

At step 206C, the user input is received. The user input may be received from a convenient user input device and/or a communication interface.

At step 208C, the user input is automatically associated with the protocol type and the signal characteristic. The automatic association may be performed by one or more data sources, for example, to include the entries for the protocol type, the signal characteristic, and the user input. Optionally, additional information may be added to the data sources automatically, based on the protocol type and the signal characteristic.

At step 210C, the library is updated to include the specified source sensor associated with the protocol type and the signal characteristic. In an embodiment, updating the data sources at step 208C may be the library update at step 210C, in which case step 208C and step 210C may be merged. The method of FIG. 2C may then terminate.

FIG. 2D shows another variation of the method of FIG. 2A. In particular, FIG. 2D shows an exemplary use of the data packet labeled at step 212.

At step 200D, at least one of a selected workpiece for which the source sensor collects data and a selected tool for which the source sensor collects the data are selected from a library. The selected workpiece or the selected tool may be selected by comparison to the same library identified above, or some other library. For example, if it is known that the sensor type is a specific kind of thermometer, then it may be determined by reference to a library that the thermometer is associated with a particular autoclave, and thus also that a particular piece composite material that is being cured.

In this case, at step 202D, information regarding at least one of the selected workpiece and the selected tool is further included in the metadata file. The metadata file may be updated in a manner similar to that described above.

The method of FIG. 2D may be varied. For example, only information regarding the selected workpiece or only information about the tool may be included in the data packet. In either case, it is possible to add additional to the metadata file regarding the tool or the workpiece.

Additionally, at step 204D, the labeled data packet can be used in a control system to control operation of a tool operating on a workpiece. For example, assume the sensor is measuring the temperature of a portion of a composite material being cured. Because the data packet is labeled, the data packet can be properly analyzed and passed to a control system. The control system extracts the temperature data from the body of the data packet. From the temperature data in the body, and possibly in combination with the protocol type, the identity of the sensor and the identity of the workpiece being cured may be determined. Knowing which workpiece is being worked on, it is also known at what time or temperature the workpiece will be done curing, or perhaps is beginning to overheat. The control system can then be used to control heating elements in the autoclave to switch on or off, or to produce more or less heat, in order to accomplish the desired curing result. Thus, one or more embodiments provide for a variation in which the labeled data packet can be used as part of a control system that controls various physical processes. In one embodiment, the method of FIG. 2D may terminate thereafter.

FIG. 2E shows a variation of FIG. 2A. In particular, FIG. 2E shows a particular means of identifying a classification of a source sensor at step 208 of FIG. 2A.

At step 200E, a model vector data structure is generated. The model vector data structure includes data entries describing at least the protocol type and the signal characteristic. The model vector data structure may be generated by converting the protocol type information and the signal characteristic data into a one dimensional data structure which includes one data entry for each particular datum type. Such a data structure is also known as a "one hot vector."

At step 202E, the model vector data structure is input into a machine learning model. Specifically, the machine learning model reads the vector as part of the execution of the machine learning model. However, it is possible to pre-program the data into the machine learning model, thus, in some cases inputting the vector into the machine learning model may be considered separate from the execution of the machine learning model.

Thus, at step 204E, the machine learning model is executed. Execution of the machine learning model is accomplished by ordering a processor to carry out the machine learning algorithm. Many different machine learning algorithms exist, such as supervised machine learning models, unsupervised machine learning models such as neural networks, and many others.

At step 206E, a predicted classification of the source sensor is output from the machine learning model. The predicted classification may take the form of a list of possible source sensors, each having a corresponding predicted probability as being the actual source sensor. In an embodiment, the selected source sensor is the source sensor having the highest predicted probability. However, other schemes could be used to select the selected source sensor.

Still additional variations are possible. For example, generating the model vector data structure further may further include adding additional information to the model vector data structure. Thus, for example, information such as a network identifier may be added to the vector that includes the protocol type and the signal characteristics identified from the header and body, respectively. In another variation, the additional information is selected from the group consisting of: a timestamp of the data packet, a rate of data packet reception, a number of a plurality of data packets having a structure similar to the data packet, tool data describing possible tools for which sensor data is taken, and workpiece data describing possible workpieces for which sensor data is taken. The additional information may increase the accuracy of the prediction of the machine learning model.

Attention is now turned to FIG. 3. FIG. 3, again, is a method of controlling operation of a tool that is operating on a workpiece.

At step 300, a tool operates on a workpiece. For example, as indicated above, an autoclave (i.e., the tool) may heat a piece of composite material (i.e., the workpiece) using a header. However, step 300 could also be a robot (i.e., the tool) building a vehicle (i.e., the workpiece). Step 300 could also be a vat (i.e., the tool) producing composite resin (i.e., the workpiece). Many variations are possible.

At step 302, a parameter of the workpiece is sensed, using a source sensor, while operating the tool on the workpiece. Thus, for example, a thermometer my measure a temperature of the workpiece. A camera may be used to deduce the position of an actuator of a robot. A viscosity sensor could be used to measure the viscosity of composite resin. Many variations are possible.

At step 304, a data packet containing information regarding the parameter is transmitted, by the source sensor via a network, to a computer. The data packet has a size. The data packet may be transmitted via either wired or wireless communication links. Encryption may be used in some embodiments to encrypt the data packet.

At step 306, the data packet is parsed, by the computer, into a header and a body. Parsing the data may be accomplished according to the techniques described with respect to FIG. 2A.

At step 308, a protocol type is identified, by the computer, from the header and the size. Identifying the protocol type may be accomplished according to the techniques described with respect to FIG. 2A.

At step 310, a signal characteristic of signal data in the body is identified by the computer. Identifying the signal characteristic may be accomplished according to the techniques described with respect to FIG. 2A.

At step 312, a classification of the source sensor which generated the data packet is identified, by the computer, based on the protocol type and the signal characteristic. Identifying the classification of the source sensor may be accomplished according to the techniques described with respect to FIG. 2A.

At step 314, a metadata file is generated, by the computer, based on the source sensor. Generating the classification of the source sensor may be accomplished according to the techniques described with respect to FIG. 2A.

At step 316, the data packet is labeled, by the computer, with the metadata file to form a labeled data packet. Labeling the classification of the source sensor may be accomplished according to the techniques described with respect to FIG. 2A.

At step 318, the labeled data packet is passed, by the computer, to a tool control system. For example, the labeled data packet may be transmitted via a wired or wireless communication system to a remote control system directly connected to the tool, or to the tool itself. The labeled data packet could also be passed to logic executing on the same computer analyzing the information, or some other communication, which is then used to control operation of the tool remotely.

At step 320, operation of the tool on the workpiece is modified using the tool control system. The control system may be used, for example, as described with respect to step 204D of FIG. 2D. In one embodiment, the method of FIG. 3 may terminate thereafter.

The method of FIG. 3 may be varied using techniques similar to those described with respect to FIG. 2B, FIG. 2C, and FIG. 2E. For example, identifying the classification of the source sensor may include comparing a combination of the protocol type and the signal characteristic to a library. The library includes pre-determined protocol types, pre-determined signal characteristics, and associated sensor types. In this case, the method includes selecting, from the library, a selected sensor type as a selected source sensor of the data packet.

In another variation, identifying the classification of the source sensor includes comparing the protocol type and the signal characteristic to a library. The library includes pre-determined protocol types, pre-determined signal characteristics, and associated sensor types. In this case, the method also includes determining that a combination of the protocol type and the signal characteristic fails to match entries in the library. The user is then prompted to provide user input specifying a specified source sensor. The user input is received. the user input is automatically associated with the protocol type and the signal characteristic. The library is updated to include the specified source sensor associated with the protocol type and the signal characteristic.

In another variation, identifying the classification of the source sensor includes generating a model vector data structure. The model vector data structure includes data entries describing at least the protocol type and the signal characteristic. In this case, the method also includes inputting the model vector data structure into a machine learning model. The method also includes executing the machine learning model. The method also includes outputting a predicted classification of the source sensor from the machine learning model. Generating the model vector data structure further may include adding additional information to the model vector data structure, as described with respect to FIG. 2E.

While the various steps in the flowcharts of FIG. 2A through FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

Figure 4:
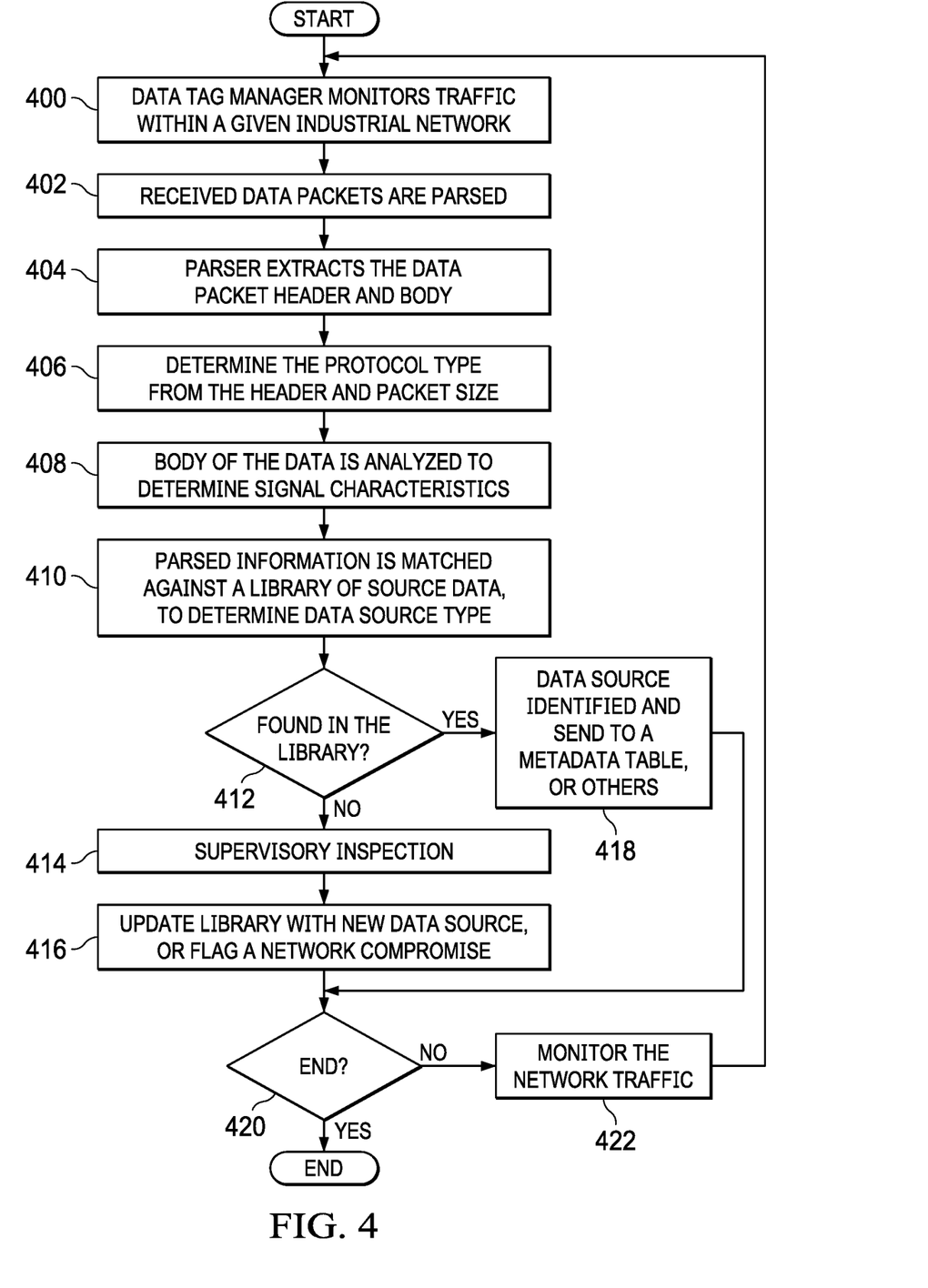
FIG. 4 shows another method of labelling data packets, in accordance with one or more embodiments.
Figure 5:
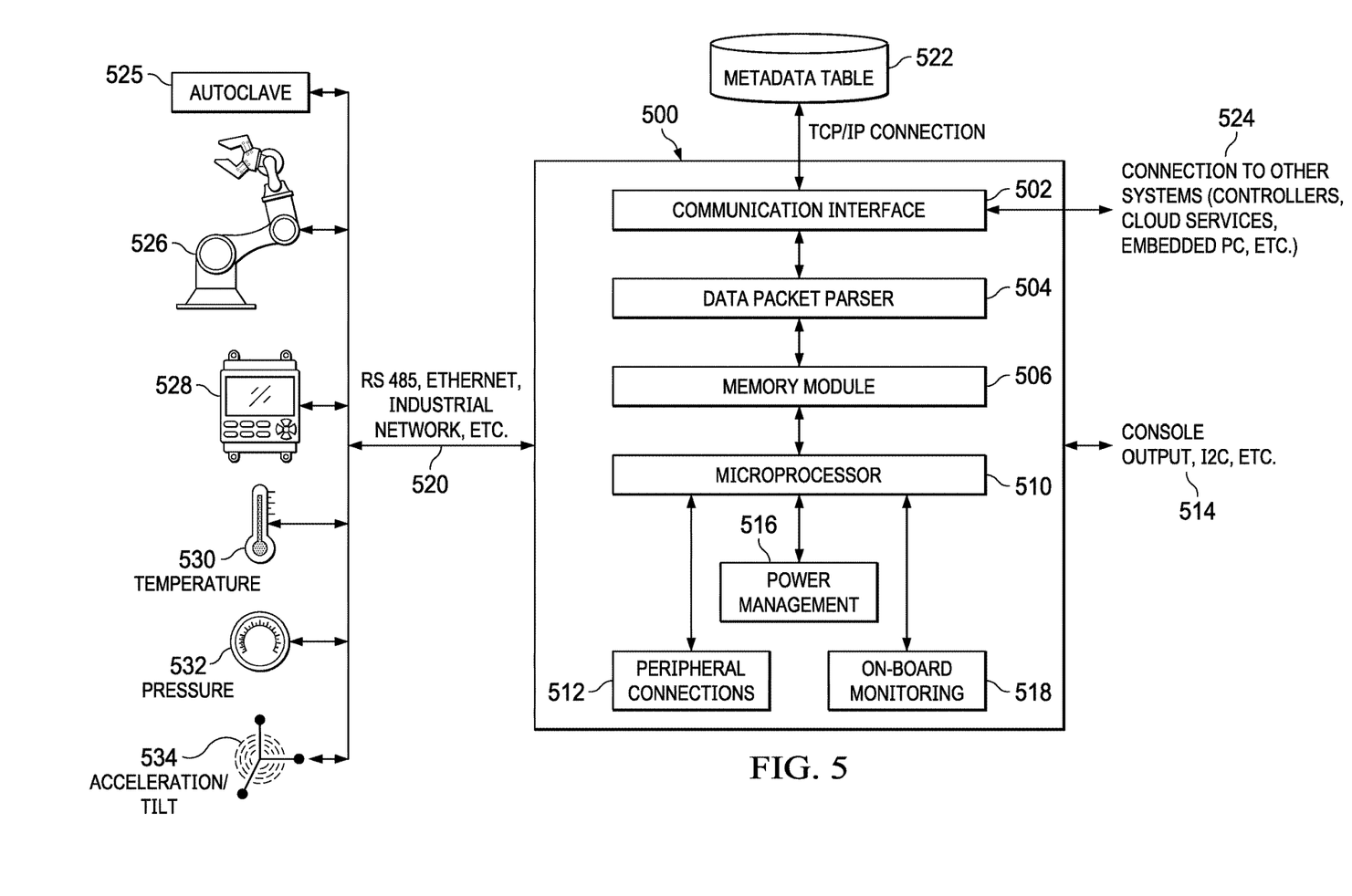
FIG. 5 shows a system for labeling data packets, in accordance with one or more embodiments.

FIG. 4 through FIG. 6 present a specific example of the techniques described above with respect to FIG. 1 through FIG. 3. The following example is for explanatory purposes only and not intended to limit the scope of the one or more embodiments. In particular, FIG. 4 shows another method of labelling data packets, in accordance with one or more embodiments. In particular, FIG. 5 shows a system for labeling data packets, in accordance with one or more embodiments. In particular, FIG. 6 shows a method for training a machine learning model, in accordance with one or more embodiments.

At step 400, a data tag manager monitors traffic within a given industrial network. The data tag manager may be the data packet parser (148) and/or the remote computer (138) of FIG. 1. The network may be network (720) of FIG. 7B. The traffic is one or more data packets, such as the data packet (102) in FIG. 1.

At step 402, the received data packets are parsed. Parsing the data packets may be performed as described with respect to step 202 in FIG. 2A. At step 404, the parser extracts the data packet header and body. Extraction may be performed as described with respect to step 204 in FIG. 2A.

At step 406, the data tag monitor determines the protocol type from the header and packet size. Determination of the protocol type may be as described with respect to step 206 of FIG. 2A.

At step 408, the body of the data packet is analyzed to determine the signal characteristics. Determination of the signal characteristics may be as described with respect to step 208 of FIG. 2A.

At step 410, the data tag manager matches the parsed information against a library of source data to determine the data source type. Determination of the data source type may be performed as described with respect to step 210 of FIG. 2A. Note that at step 410, the determine of the data source type may be determination of a type of source sensor, the identity of a source sensor, the type or specific identity of a tool being used, a type or specific identity of workpiece being used, etc., depending on what is the data source of interest.

At step 412, a determination is made whether the parsed information is found in the library. If not, then at step 414, a user performs a supervisory inspection of the parsed information. The user, at step 416, then updates the library with the new data source, or flags a network compromise. To "flag," in the context of the one or more embodiments, means to mark, to draw attention to, or process differently. A network compromise is any significant change in data packet structure, relative to an expected data packet structure or relative to previously received data packets. The term "significant" means a relative change in data packet structure relative to a numerically determinable threshold amount of change. The threshold may be set automatically by the user, or may be determined by some automatic computer-implement policy, or may be predicted by machine learning. The method then continues to a determination whether the method should end at step 420.

Returning to step 412, if the parsed information is found in the library, then at step 418, the data source is identified from the library. Additionally, the identification of the data source is sent or compared to a metadata table or library. The metadata used for labeling the data packet is retrieved from the metadata table or library.

The method then continues to a determination whether the method should end at step 420. If the method continues, then at step 422 the network traffic is monitored. The method then returns to step 400 and repeats. Otherwise, then after step 420, the method terminates.

Attention is now turned to FIG. 5. FIG. 5 shows a hardware system for labeling a data packet and a control system for using the labeled data packet to control a device. Thus, the hardware system of FIG. 5 may be used to implement the methods of FIG. 2A through FIG. 2E, FIG. 3, and FIG. 4, and is an alternative to the system shown in FIG. 1.

The system (500) includes a communication interface (502). The communication interface facilitates communication of the system (500) with components external to the system (500). The communication interface (502) may be communication interface (708) shown in FIG. 7.

The system (500) also includes a data packet parser (504). The data packet parser (504) parses data packets received via the communication interface (502). The data packet parser (504) may be the data packet parser (148) of FIG. 1 and may be used according to the method described in FIG. 2A.

The system (500) also includes a memory module (506). The memory module (506) stores information in the system (500), including the data packets, metadata used for labeling the data packets, libraries, etc. The memory module (506) may be the library (126) described with respect to FIG. 1.

The system (500) also includes a microprocessor (510). The microprocessor (510) provides the hardware for executing the methods described with respect to FIG. 2A through FIG. 3. The microprocessor (510) may be the processor (134) described in FIG. 1.

The system (500) may also include peripheral connections (512). The peripheral connections (512) connect to external peripherals, such as a console (514), monitor, a user input device, etc.

The system (500) also includes a power management system (516). The power management system (516) may be a power supply and/or battery, or similar device.

The system (500) also includes an on-board monitoring system (518). The on-board monitoring system (518) includes software and/or hardware for monitoring the network traffic via communication link (520). The on-board monitoring system (518) may handle comparing the information from parsed data packets to a metadata table (522) via the communication interface (502), as described with respect to FIG. 2A through FIG. 2E. Note that the communication interface (502) may also be connected to other systems (524), such as but not limited to controllers, cloud services, embedded personal computers (PCs), etc.

The system (500) may be connected via the communication link (520) to one or more tools, such as an autoclave (525), a robotic assembler (526), and/or a composite material production machine (528). One or more sensors configured to sense parameters of the tools and/or their associated workpieces may be in communication with the system (500) via the communication link (520). Thus, for example, data regarding physical parameters such as temperature (530), pressure (532) and/or acceleration or tilt (534) of the tools or their associated workpieces may be measured. The sensors produce the data packets that are passed to the system (500) for automatic labeling, as described above.

Attention is now turned to FIG. 6, which provides a more detailed example of a method of training a machine learning model, such as the trained machine learning model (122) in FIG. 1. At step 600, a corpus is received, the corpus including parsed data packets organized into groups corresponding to known sensor types. Thus, the corpus may be referred to as an annotated corpus. The corpus may be received by a training application being executed by a processor.

At step 602, at least part of the corpus is input as a vector into a machine learning model. The machine learning model has several layers that perform a correlation between parsed packet information and sensor types. The corpus may be input as a vector by first embedding the corpus in the form of a vector. Embedding may be accomplished by another machine learning process or some other rule-based process, not described herein, which translates data in the corpus into numbers that form the values of the features in the vector.

At step 604, a probability is determined that a first combination of protocol type and signal characteristic corresponds to a specific sensor type. The determination is performed by the layers in the machine learning model during execution of the machine learning model. The layers acting in concert assign a probability, which may be expressed as a number between zero and one, to one or more of the features in the vector. Those probabilities that exceed a threshold value, such as but not limited to 0.5, may be marked as likely sensor candidates. Thus, in one example, the first sensor type is assigned a probability of at least 0.5, and thus is identified as a candidate sensor.

At step 606, a determination is made of whether the predicted sensor type corresponds to the known sensor type. If the predicted sensor type is the same as the known sensor type, then the process terminates.

At step 608, a loss function is calculated. The loss function is calculated by comparing and evaluating a difference between the probability the machine learning model predicted for the most likely sensor type candidate at step 604, and the probability that the machine learning model predicted for the known sensor type. A weighted formula may be applied to the difference in some embodiments. The difference in probability reflects an error in the machine learning model at step 602.

The difference in probability is the basis for calculating the loss function at step 608. The loss function itself is one or more commands to change one or more parameters of the machine learning model at step 602. The parameters change how the layers interact to form the probabilities described above. Thus, the result of applying the loss function at step 608 to the machine learning model at step 602 is to form a new or revised machine learning model.

The process is then repeated. The training corpus at step 600 is applied to the revised machine learning mode, the output is generated, and a determination is made whether the output matches the known result. The process continues to repeat until convergence has been achieved, whereupon the method of FIG. 6 terminates. Convergence occurs when, even after the loss function has been applied at step 608, the output of the machine learning model at step 604 no longer improves. Convergence also occurs when the output at step 604 exactly equals the known output.

FIG. 7A and FIG. 7B are examples of a computing system and a network, in accordance with one or more embodiments. The embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processor(s) (702), non-persistent storage device(s) (704) (e.g., volatile memory, such as random access memory (RAM), cache memory), persistent storage device(s) (706) (e.g., a hard disk, an optical drive such as a compact disk (CD) drive or digital versatile disk (DVD) drive, a flash memory, etc.), a communication interface (708) (e.g., Bluetooth interface, infrared interface, network interface, optical interface, etc.), and numerous other elements and functionalities that implement the features and elements of the disclosure.

The computer processor(s) (702) may be an integrated circuit for processing instructions. For example, the computer processor(s) (702) may be one or more cores or micro-cores of a processor. The computing system (700) may also include one or more input device(s) (710), such as a touchscreen, a keyboard, a mouse, a microphone, a touchpad, an electronic pen, or any other type of input device.

The communication interface (708) may include an integrated circuit for connecting the computing system (700) to a network (not shown) (e.g., a local area network (LAN), a wide area network (WAN) such as the Internet, a mobile network, or any other type of network) and/or to another device, such as another computing device.

Further, the computing system (700) may include one or more output device(s) (712), such as a screen (e.g., a liquid crystal display (LCD), a plasma display, a touchscreen, a cathode ray tube (CRT) monitor, a projector, or other display device), a printer, an external storage, or any other output device. One or more of the output device(s) (712) may be the same or different from the input device(s) (710). The input and output device(s) (710 and 712) may be locally or remotely connected to the computer processor(s) (702), the non-persistent storage device(s) (704), and the persistent storage device(s) (706). Many different types of computing systems exist, and the aforementioned input and output device(s) (710 and 712) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system (700) shown in FIG. 7A, or a group of nodes combined may correspond to the computing system (700) shown in FIG. 7A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system (700) shown in FIG. 7A. Further, the client device (726) may include and/or perform all or a portion of one or more embodiments.

The computing system (700) or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing the one or more embodiments, may extract one or more data items from the obtained data. For example, the extraction may be performed as follows by the computing system (700) in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (700) of FIG. 7A, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (700) in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (700) of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (700) of FIG. 7A and the nodes (e.g., node X (722), node Y (724)) and/or client device (726) in FIG. 7B. Other functions may be performed using the one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
receiving a data packet over a network, the data packet having a size;
parsing the data packet into a header and a body;
identifying a protocol type from the header and the size;
identifying a signal characteristic of signal data in the body;
identifying a classification of a source sensor which generated the data packet based on the protocol type and the signal characteristic;
generating a metadata file based on the source sensor; and
labeling the data packet with the metadata file to form a labeled data packet.

2. The method of claim 1, wherein identifying the classification of the source sensor comprises:
comparing a combination of the protocol type and the signal characteristic to a library, wherein the library comprises a plurality of pre-determined protocol types, a plurality of pre-determined signal characteristics, and a plurality of associated sensor types; and
selecting, from the library, a selected sensor type as a source sensor of the data packet.

3. The method of claim 1, wherein:
identifying the classification of the source sensor comprises:
comparing the protocol type and the signal characteristic to a library, wherein the library comprises a plurality of pre-determined protocol types, a plurality of pre-determined signal characteristics, and a plurality of associated sensor types;
determining that the protocol type and the signal characteristic fails to match entries in the library;
prompting a user to provide user input specifying a specified source sensor;
receiving the user input, and
the method further comprises:
automatically associating the user input with the protocol type and the signal characteristic, and
updating the library to include the specified source sensor associated with the protocol type and the signal characteristic.

4. The method of claim 1, further comprising:
selecting, from a library, a selected workpiece for which the source sensor collects data; and
further including, in the metadata file, information regarding the selected workpiece.

5. The method of claim 1, further comprising:
selecting, from a library, a selected tool for which the source sensor collects data; and
further including, in the metadata file, information regarding the selected tool.

6. The method of claim 1, further comprising:
selecting, from a library, at least one of a selected workpiece for which the source sensor collects data and a selected tool for which the source sensor collects the data; and
further including, in the metadata file, information regarding at least one of the selected workpiece and the selected tool.

7. The method of claim 1, wherein identifying the classification of the source sensor comprises:
generating a model vector data structure, wherein the model vector data structure comprises data entries describing at least the protocol type and the signal characteristic;
inputting the model vector data structure into a machine learning model;
executing the machine learning model; and
outputting a predicted classification of the source sensor from the machine learning model.

8. The method of claim 7, wherein generating the model vector data structure further comprises adding additional information to the model vector data structure.

9. The method of claim 8, wherein the additional information is selected from the group consisting of: a timestamp of the data packet, a rate of data packet reception, a number of a plurality of data packets having a structure similar to the data packet, tool data describing possible tools for which sensor data is taken, and workpiece data describing possible workpieces for which sensor data is taken.

10. The method of claim 1, further comprising:
using the labeled data packet in a control system to control operation of a tool operating on a workpiece.

11. A method comprising:
operating a tool on a workpiece;
sensing, using a source sensor, a parameter of the workpiece while operating the tool on the workpiece;
transmitting, by the source sensor via a network, a data packet containing information regarding the parameter to a computer, the data packet having a size;
parsing, by the computer, the data packet into a header and a body;
identifying, by the computer, a protocol type from the header and the size;
identifying, by the computer, a signal characteristic of signal data in the body;

identifying, by the computer, a classification of the source sensor which generated the data packet based on the protocol type and the signal characteristic;

generating, by the computer, a metadata file based on the source sensor;

labeling, by the computer, the data packet with the metadata file to form a labeled data packet;

passing, by the computer, the labeled data packet to a tool control system; and modifying, using the tool control system, operation of the tool on the workpiece.

12. The method of claim 11, wherein identifying the classification of the source sensor comprises:

comparing a combination of the protocol type and the signal characteristic to a library, wherein the library comprises a plurality of pre-determined protocol types, a plurality of pre-determined signal characteristics, and a plurality of associated sensor types; and selecting, from the library, a selected sensor type as a selected source sensor of the data packet.

13. The method of claim 11, wherein:

identifying the classification of the source sensor comprises:

comparing the protocol type and the signal characteristic to a library, wherein the library comprises a plurality of pre-determined protocol types, a plurality of pre-determined signal characteristics, and a plurality of associated sensor types;

determining that a combination of the protocol type and the signal characteristic fails to match entries in the library;

prompting a user to provide user input specifying a specified source sensor;

receiving the user input, and the method further comprises:

automatically associating the user input with the protocol type and the signal characteristic, and updating the library to include the specified source sensor associated with the protocol type and the signal characteristic.

14. The method of claim 11, wherein identifying the classification of the source sensor comprises:

generating a model vector data structure, wherein the model vector data structure comprises data entries describing at least the protocol type and the signal characteristic;

inputting the model vector data structure into a machine learning model;

executing the machine learning model; and outputting a predicted classification of the source sensor from the machine learning model.

15. The method of claim 14, wherein generating the model vector data structure further comprises adding additional information to the model vector data structure.

16. A system comprising:

a communication interface configured to receive a data packet over a network, the data packet having a size;

a data packet parser configured to parse the data packet into a header and a body;

a data repository storing a classification system;

a processor programmed to:

identify a protocol type from the header and the size;

identify a signal characteristic of signal data in the body;

apply the classification system to identify a classification of a source sensor which generated the data packet based on a combination of the protocol type and the signal characteristic;

generate a metadata file based on the source sensor;

label the data packet with a metadata file to form a labeled data packet; and transmit the labeled data packet.

17. The system of claim 16, wherein the processor is further configured to transmit the labeled data packet by performing at least one of: transmitting the labeled data packet to the data repository, transmitting the labeled data packet to a remote computer, and transmitting the labeled data packet to a tool associated with the source sensor.

18. The system of claim 17, wherein the classification system comprises one of:

a library; and a trained machine learning model.

19. The system of claim 17, further comprising:

a control system in communication, via the communication interface, with a tool operable on a workpiece for which the source sensor generates the data packet; and wherein the control system is configured to use the labeled data packet to control operation of the tool.

20. The system of claim 19, wherein:

the tool comprises an autoclave comprising a heater;

the source sensor measures a temperature of the workpiece; and the control system controls the heater based on the labeled data packet.

* * * * *